July 10, 1962  J. B. SAUNDERS  3,043,182
INTERFEROMETER FOR TESTING LARGE SURFACES
Filed March 21, 1960  2 Sheets-Sheet 1

INVENTOR
James B. Saunders
BY David Robbins
John C. Stahl
ATTORNEYS

3,043,182
INTERFEROMETER FOR TESTING LARGE SURFACES
James B. Saunders, Alexandria, Va., assignor to the United States of America as represented by the Secretary of Commerce
Filed Mar. 21, 1960, Ser. No. 16,617
3 Claims. (Cl. 88—14)

The present invention relates to an interferometer that permits the testing of precision flat surfaces and more particularly to a simple, sensitive interferometer for measuring the flatness of large surfaces, i.e., up to 16 feet and more in length.

Such an instrument greatly facilitates the testing of precision flat surfaces such as aircraft fixtures, machine ways and layout plates which must be carefully examined for irregularities. The subject interferometer not only allows a quick check on surface quality but also provides a means of production control by locating the spots where added polishing or lapping are required.

The only other known interferometric device designed for investigating large areas has not heretofore been used extensively due primarily to its extreme complexity. The instrument of the subject invention, on the other hand, is relatively simple and easy to operate, is twice as sensitive as the referred-to prior art interferometer and is relatively free from vibration, thereby providing an interferometric device which aids materially in the control of dimensional tolerances of machine-produced parts.

It is accordingly an immediate object of the present invention to provide an improved interferometer enabling the rapid determination of flatness in connection with large surfaces without requiring contact with the surface being measured.

It is a further object of this invention to provide such a device which is easy to use and maintain in good working condition and which is adaptable to a variety of alignment testing problems.

Another object of the invention is to provide a device by which a single operator may quickly obtain very precise angular measurements of the alignment of extended surfaces.

Still another object of this invention is to provide a device which allows closer dimensional control of machine-produced parts.

Other objects and features of the invention will become apparent to those skilled in the art as the disclosure is made in the following detailed description of a preferred embodiment of the invention as illustrated in the accompanying sheets of drawings in which:

FIG. 2A illustrates such a fringe pattern produced by white light on a layout plate having a granite surface;

FIG. 2B illustrates a pattern produced by monochromatic light on a layout plate having a badly scratched cast iron surface;

FIGS. 2C–2D illustrate fringe patterns produced by monochromatic light on the granite surface of FIG. 2A;

As in other interferometers, the basic principle utilized in the present invention is that if two beams of light from the same source travel along different paths and then come together again they will form a pattern of interference fringes, the number of fringes is dependent upon the difference in optical path length.

The interferometer of this invention permits extension to large areas by causing a collimated beam of light to reflect from the specimen at a large angle of incidence. The resultant fringe pattern is a contour map of the surface relative to an arbitrarily chosen plane and the contour interval is a function of wavelength and angle of incidence. Each pattern is formed by the interference of light rays reflecting from different parts of the same surface, a result obtained by using a double-image prism. Areas of any size can be tested by merely adjusting the angle of incidence of the light on the surface, the width of the area examined at each setting being equal to the linear aperture of the instrument.

Figure 1:
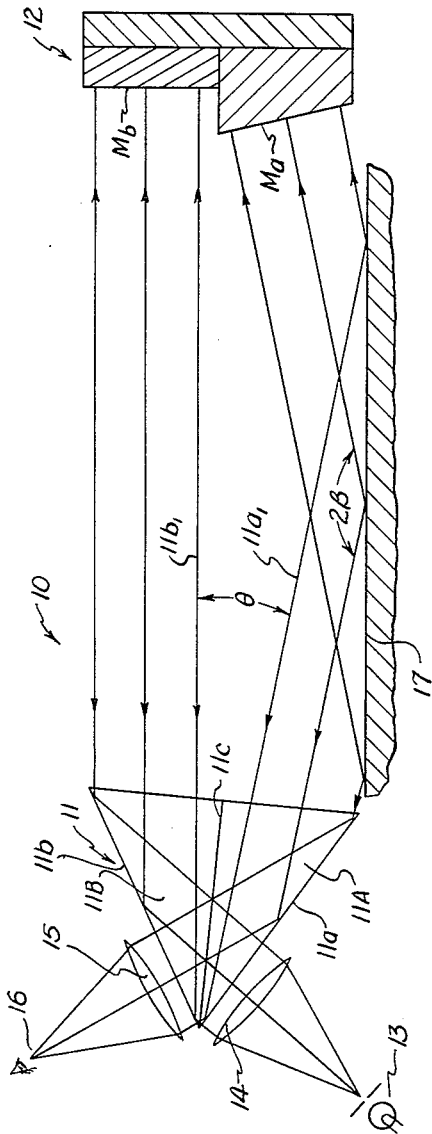
FIG. 1 is a symbolic drawing of an interferometric alignment apparatus illustrating the optical principles of the invention.

The principal optical components employed in the invention are diagrammatically shown in FIG. 1. A double-image Kösters prism 11 is made by taking two 30–60–90° prisms, 11A—11B, respectively, depositing a semitransparent layer of aluminum on a face of one of them and cementing the two together with the aluminized face on the inside. The resulting unit is a 60–60–60° prism, the partially aluminized surface of which becomes a semireflecting plane. The detailed construction of such a prism is described in an article by the present applicant in the NBS Journal of Research (January 1957). For purposes of convenience only, henceforth throughout the body of the specification and the claims, the aluminized layer heretofore referred to will be designated as the central or dividing plane.

With reference to FIG. 1 of the drawings, the interferometer 10 of this invention includes a Kösters double-image prism indicated generally at 11 and a reflecting or mirror unit indicated generally at 12. Light from a point source 13 is collimated into a parallel beam of light by a lens 14, the axis of which is approximately normal to a face 11a of the double-image prism 11. A viewing tube (not shown) containing an objective lens 15 has its axis approximately normal to face 11b of double-image prism 11.

The principal element of the interferometer 10 is the double-image Kösters prism 11, constructed in the manner heretofore described, which is mounted in any conventional manner so as to place the dividing plane 11c of said prism at a desired angle with respect to the surface to be tested, however, it is to be understood that said dividing plane may be adjustably positioned at any angle with respect to the test surface as will hereinafter be discussed in detail.

Referring again to FIG. 1 of the drawings, wherein the light ray paths of the interferometer 10 are diagrammatically illustrated, the optical axis of the collimating lens 14 is substantially perpendicular to face 11a so as to produce oblique incidence of the beam upon the dividing plane 11c. The beam of light passed by lens 14 is separated into two coherent beams 11a and 11b by dividing plane 11c. The beam $11a_1$ is directed onto a surface 17 which is to be tested and consequently the beam $11a_1$ conveniently may be designated as a "test beam." Similarly, beam $11b_1$ may be designated as a "reference beam" since it is reflected by the reference surface provided by mirror $M_b$. For purposes of convenience only, the optical path of a single ray from each of the two beams $11a_1$—$11b_1$ will hereinafter be described, it is to be understood, of course, that other rays within the respective beams will follow parallel paths. As illustrated in FIG. 1, ray $11b_1$ continues ahead to the opposite face 11b of the double-image prism 11 and is then internally reflected outward. The other ray, $11a_1$, is bent back by the dividing plane $11c$ to the face $11a$ through which it entered and then reflected outward as indicated by the arrows (see FIG. 1). The two emerging rays (which derive from a single original ray) are symmetrical with respect to the central plane. In a manner hereinafter to be described, the entrance angle of the collimated light may be adjusted to a desired deviation $\theta$ between the component rays $11a_1$—$11b_1$.

As diagrammatically shown in FIG. 1 of the drawings, rays $11a_1$—$11b_1$ are directed to impinge at normal incidence onto distant plane mirrors $M_a$ and $M_b$, respectively, which are held in substantially vertical position in a conventional manner. The reflectivity of mirrors $M_a$ and $M_b$ are designed to give approximatvely equal intensity for the two light beams at a receiving point 16.

When the positions of mirrors $M_a$—$M_b$ are properly adjusted, the beams are reflected back along their outgoing paths into the dividing plane $11c$ where the beams recombine in interfering relation. For example, the beam of light of which $11a_1$ is typical is reflected from a test surface 17 at an angle of incidence of $\beta$ degrees ($\beta$ is the angle of incidence of light), then normally from mirror $M_a$, and returns upon itself to combine with ray $11b_1$ at the dividing plane $11c$. The observer at 16 sees interference fringes on the superimposed images of the two mirrors, which interference fringes are a measure of surface evenness and flatness. Futhermore, by adjusting the angle of incidence $\beta$ surfaces of any length can be tested.

In general, the fringes that appear at 16 represent contours of equal elevation. They lie along straight lines if the surface under test is perfectly flat, but are curved if the surface is not flat. Small irregularities which do not affect over-all flatness characteristics produce serrated or ragged fringes. The number of fringes and therefore the fringe width is adjustable but the contour interval thereby represented depends upon the wavelength of the light used and the angle of incidence.

Specifically, the gross aspects of the fringe pattern (fringe direction and spacing) are controlled by the wedge angle $\theta$ between the wave fronts of beams $11a_1$—$11b_1$ while the small irregularities of the fringe pattern are a function of the irregularities of the test surface. If the test surface 17 is perfectly flat, the fringes will be straight and parallel. Any curvature of the test surface introduces a corresponding curvature in the wave front of beam $11a_1$ and this wave front, when compared with the wave front of wave $11b_1$, in a manner heretofore described, introduces curvature into the otherwise straight fringes.

Referring now to FIGS. 2A–2D of the drawings, typical interference fringe patterns produced by the large surface interferometer of FIG. 1 are illustrated. These patterns represent an area 36 inches in length by 1¾ inches in width wherein the angle of incidence of light upon the test surface is approximately 87½ degrees. Because of the large angle of incidence, the test beam of 1¾ inch diameter can illuminate the full length of a test surface whose length is more than twenty times the diameter of the test beam.

Figure 2A:
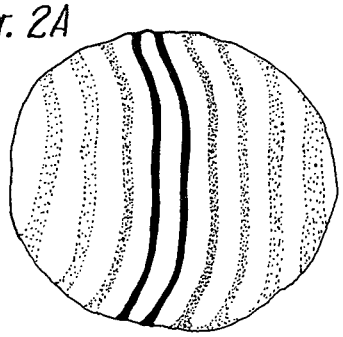
FIGS. 2A–2D show typical fringe patterns produced by the apparatus of FIG. 1 wherein the angle of incidence of light on the surface plate undergoing test is approximately 87½°.

The pattern of FIG. 2A illustrates a pattern produced with white light upon a granite surface layout plate and shows the concavity of the surface. Since the reflectivity of a surface increases with angles of incidence, this relatively rough (diffusely reflective) surface was tested with light having a large angle (i.e., slightly less than ninety degrees) of incidence. As shown in the fringe pattern, very smooth fringes were obtained, which demonstrates that the rough surface reflected the incident test beam in a substantially "regular" manner.

Figure 2B:
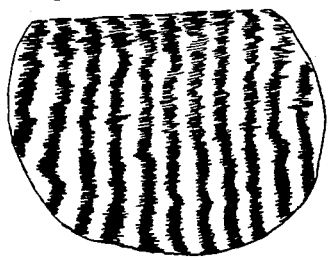
Figure 2C:
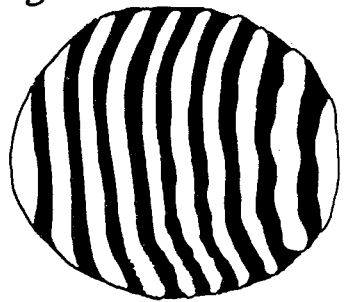
Figure 2D:
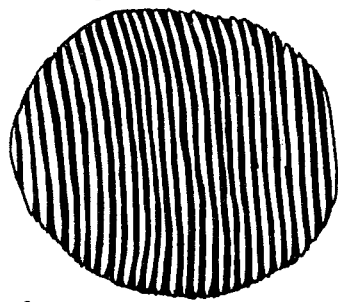

The patterns of FIGS. 2B–2D were produced by monochromatic ($\lambda$=5876 A.) light. FIG. 2B illustrates a pattern produced by monochromatic light upon a badly scratched (diffusely reflective) cast iron surface. In said pattern a departure from straightness of one fringe corresponds to a deviation from flatness of 5.75$\lambda$ (approximately 0.00013 inch). Although this surface was badly scratched, the test results show that its over-all flatness characteristics are excellent.

FIGS. 2C–2D illustrate patterns produced by monochromatic light upon the granite surface utilized in FIG. 2A. The difference between patterns 2C–2D results from changing the angle between the two interfering wavefronts, thereby changing the width of the fringes.

Figure 3:
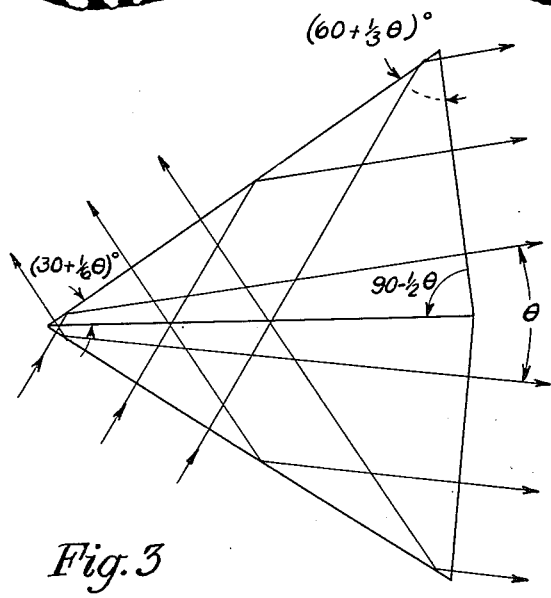
FIG. 3 is a diagrammatic representation showing a modified Kösters double-image prism to be utilized with monochromatic light.

As described in connection with the fringe pattern of FIG. 2A, white light may be used, however, the resulting difficulty in finding and adjusting the fringes exceeds the inconveniences associated with monochromatic light. If, however, white light is to be used, differential reaction may be reduced to a minimum by using the modified Kösters prism shown in FIG. 3 of the drawings. The procedure for making such a prism differs from that heretofore described in that all surfaces are finished before cutting the prism into two parts.

Figure 4:
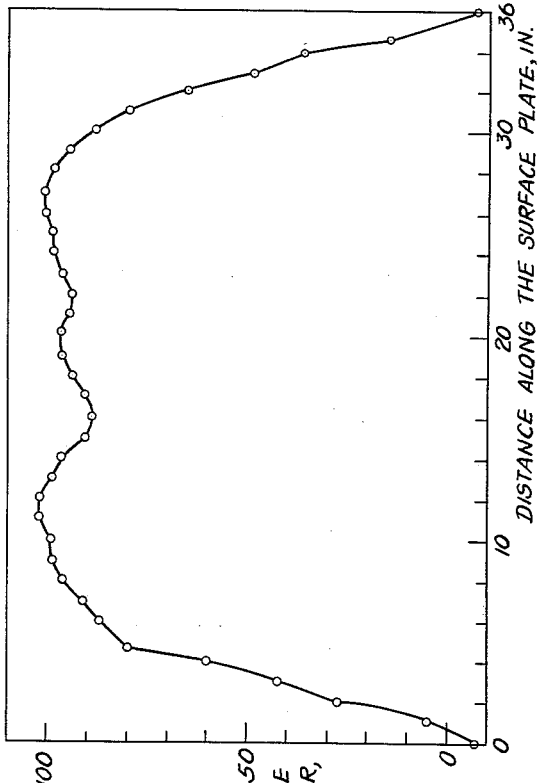
FIG. 4 is a graphical presentation of the fringe pattern of FIG. 2A wherein the surface contour in $\mu$ inches is plotted against the distance along the surface plate in inches.

There is shown in FIG. 4 of the drawings data plotted from the interferometric measurements on the granite surface layout plate of FIG. 2A. In said figure the surface contour in $\mu$ inches is plotted against the distance along the surface plate in inches. Irregularities as small as $10\mu$ inches are determinable from said graph.

In the prior art interferometers previously used for measuring flatness, a one-fringe departure from straightness corresponds to a surface departure from flatness of $\lambda$ (2 cos $\beta$) where $\lambda$ is the wavelength of light and $\beta$ the angle of incidence. In the present invention, however, wherein the sensitivity of the instrument depends upon the value of $\beta$, since light is reflected twice from the test surface the sensitivity is double that of conventional interferometers, that is, equal to $\lambda$ (4 cos $\beta$) for the same angle of incidence. Consequently, even though the sensitivity is lowered by increasing the angle of incidence to cover long surfaces, it is sufficiently high for current standards requirements.

To test this instrument, a 1¾-inch aperture system was adjusted to cover a 36-inch surface, requiring an 87½° angle of incidence. With light having a wavelength of 0.5878$\mu$, for example, one fringe corresponds to approximately 0.0001 inch. As an experienced observer can estimate fringes to better than one-tenth of a fringe spacing, surface irregularities of approximately $10\mu$-inch are readily determinable.

The maximum length of surface that may be covered with one setting is $A$ sec $\beta$, where A is the aperture of the prism. Thus, by changing $\beta$, any length is covered with a prism of a given aperture, it is understood, of course, that the sensitivity of the instrument decreases with increasing angles of incidence.

In a modification of the instrument of this invention, apparatus such as is well known in the art is employed to provide variable angles $\theta$ and $\beta$. In this manner a test surface of any desired length can be made to fill the aperture of the prism, thereby producing maximum sensitivity for the surface measured. However, since the value of $\beta$ must be known for evaluating a fringe pattern, in another modification of the invention, fixed values of $\theta$ and $b$ are utilized with adjustable end mirrors $M_a$ and $M_b$, said mirrors are bound into a rigid unit and the mirror unit and prism housing also rigidly bound together, thereby eliminating the necessity of making frequent measurement of $\beta$ and also adding to the stability of the instrument. Such an instrument has a fixed adjustment and can be used by an unskilled operator.

Alternatively, a cover (not shown) that encloses the light beams and positioned between the prism and end mirrors, respectively, greatly enhances the stability of the fringes and is to be used unless the surrounding air is in a steady state.

It is understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention.

What is claimed is:

1. In an interferometer wherein a collimated beam of light is divided into reference and test beams which are reflected from a plano reference mirror and a test surface, respectively, and recombined so as to form interference fringes which are indicative of the flatness of the test surface, the combination of: a diffusely reflective test surface whose length is many times greater than the diameter of said test beam disposed relative to the axis of said test beam at an angle of incidence of slightly less than 90°, whereby substantially the entire length of said test beam is illuminated by said test beam and said test beam is reflected from said test surface in a substantially regular manner, and an auxiliary plano mirror disposed normal to the axis of the beam reflected from said test surface so as to cause said reflected beam to retrace its path.

2. Interferometric apparatus for testing the flatness of large surfaces, comprising: means for projecting a collimated beam of light, means for dividing said collimated beam into reference and test beams, plano reference mirror means for reflecting said reference beam back along its original path to said dividing means, means for holding a test surface whose length is many times greater than the diameter of said test beam relative to the axis of said test beam at such an angle of incidence that substantially the entire length of said test surface is illuminated by said test beam, auxiliary plano mirror means disposed on the far side of said test surface holding means for reflecting said test beam back along its original path to said dividing means, said dividing means comprising means for combining said reflected reference and test beams so as to produce interference fringes, and means for viewing said fringes.

3. Apparatus as set forth in claim 2 wherein said angle of incidence of said test beam on said test surface is slightly less than 90°, whereby said test surface may be diffusely reflective.

References Cited in the file of this patent

UNITED STATES PATENTS

| 1,824,668 | Hasselkus et al. | Sept. 22, 1931 |
| 2,880,644 | Brockway et al. | Apr. 7, 1959 |

FOREIGN PATENTS

| 646,760 | Great Britain | Nov. 29, 1950 |

OTHER REFERENCES

Article, "Interferometer Tests Large Surfaces," Instruments and Control Systems, vol. 32, page 634, May 1959.